Dec. 1, 1959    J. C. AGARWAL    2,915,379
METHOD AND APPARATUS FOR HANDLING REDUCING GASES
Filed Sept. 10, 1956    3 Sheets-Sheet 1
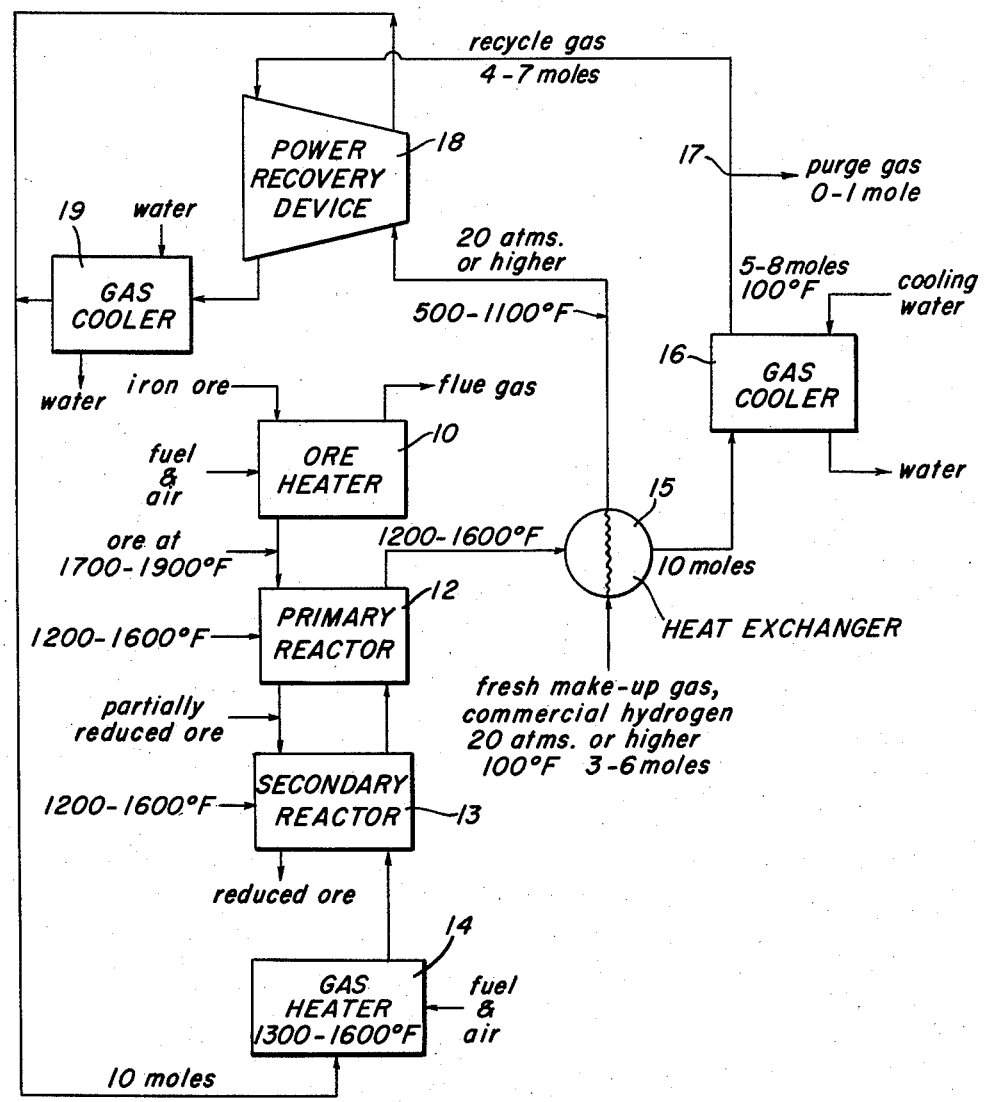

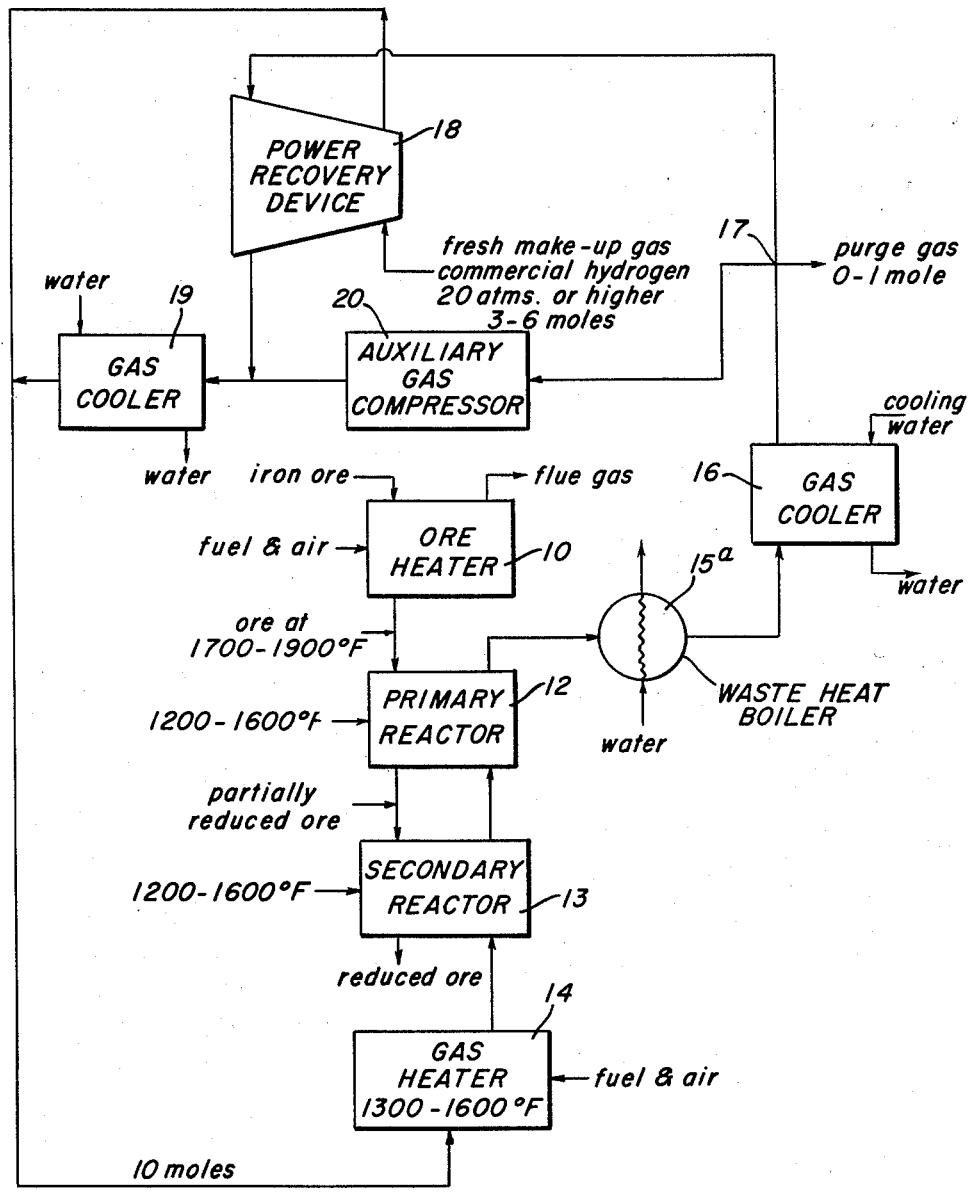

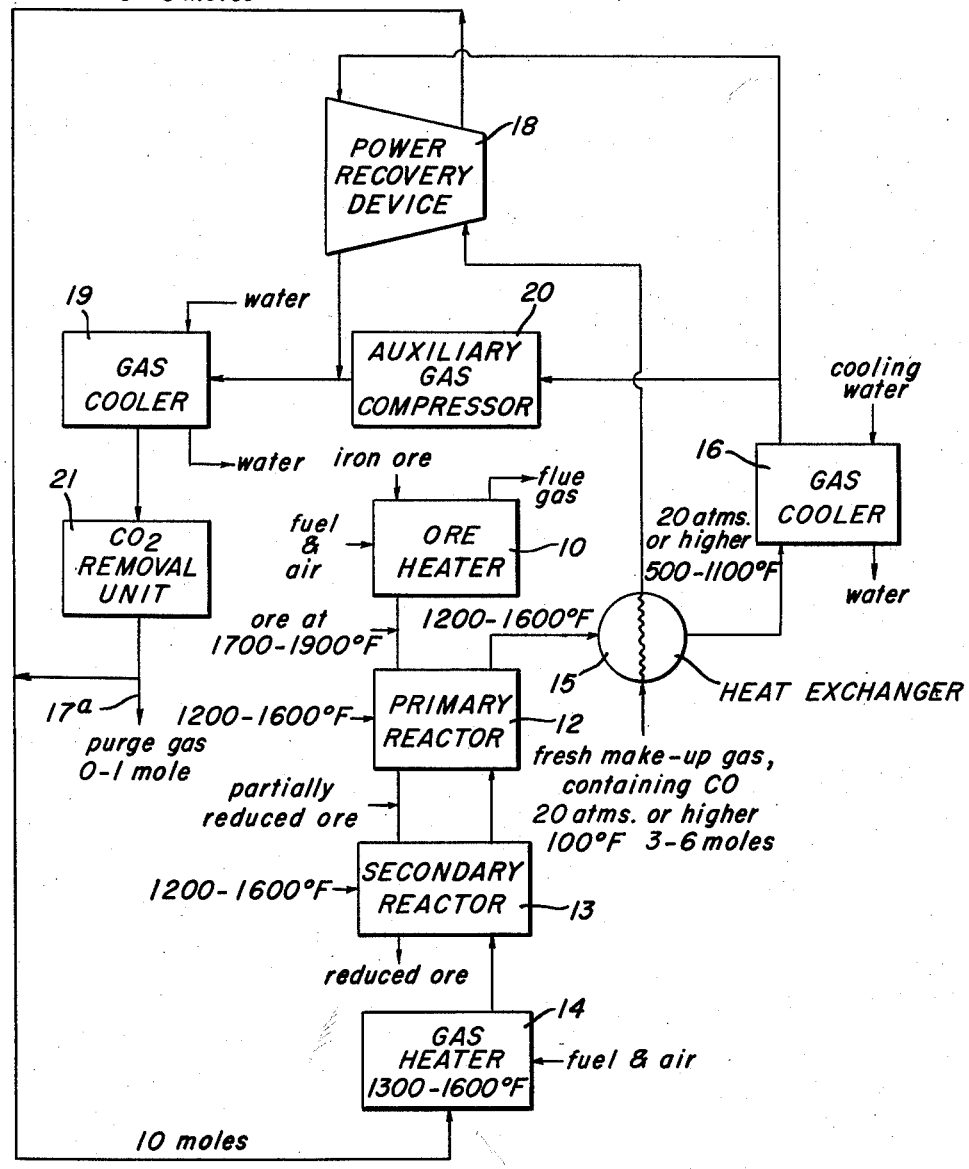

United States Patent Office 2,915,379
Patented Dec. 1, 1959

2,915,379

METHOD AND APPARATUS FOR HANDLING REDUCING GASES

Jagdish C. Agarwal, Penn Township, Allegheny County, Pa., assignor to United States Steel Corporation, a corporation of New Jersey Application September 10, 1956, Serial No. 609,025

10 Claims. (Cl. 75—26)

This invention relates to an improved method and apparatus for handling reducing gas in a continuous direct reduction process for metallic oxides.

In a conventional direct reduction process, metallic oxides are treated at an elevated temperature with a reducing gas such as hydrogen or a mixture of hydrogen and carbon monoxide which can contain up to about 25 percent carbon monoxide by volume. The reactions consume a portion of the reducing gas, which oxidizes to form water and/or carbon dioxide, but leave a substantial portion unconsumed. To avoid loss of the latter, the usual practice is to regenerate off-gas from the reduction system for recycling by removing oxidation products and purging a small portion to limit build-up of inerts. Fresh reducing gas is added to the regenerated gas before recycling to make up for the portions consumed and purged. Initially the off-gas is at relatively low pressure, and conventionally, after water removal and purging, it passes through a compressor so that it re-enters the reduction system at a pressure of 20 to 100 p.s.i.g.

With proper control of reactions, the portion of reducing constituents which remain unconsumed in the off-gas can be minimized, leaving a smaller volume to be pressurized and recycled. For example, efficiency in gas utilization can be promoted by reducing higher oxides of iron in steps, first to FeO and second to metallic iron, either wholly or partially. Nevertheless, no reducing gas can be utilized beyond the point at which the ratio of the oxidation products to the active constituents (for example $H_2O/H_2$ or $CO_2/CO$) is in equilibrium for the reactions involved, no matter how efficient the process. Thus, if off-gas is recycled, prior procedures cannot overcome the need for compressors and power to operate them.

An object of the present invention is to provide an improved method and apparatus for handling a reducing gas in a direct reduction process in which need for an outside energy source to pressurize recycled gas either is eliminated altogether or reduced substantially.

A further object is to provide an improved gas handling method and apparatus which utilizes inherent pressure in fresh reducing gas manufactured with conventional equipment as a means for pressurizing recycled reducing gas.

A more specific object is to provide an improved gas handling method and apparatus which embodies a power recovery device, such as an expander turbine compressor, for using fresh reducing gas inherently at high pressure to pressurize the low pressure recycled reducing gas, thereby adjusting the pressure of the reducing gas mixture fed to the reduction system to the desired level.

A further object is to utilize sensible heat in off-gas for preheating fresh reducing gas and at the same time increasing the efficiency at which energy can be recovered from the latter, whereby heating equipment of smaller capacity can suffice for the process.

In the drawing:

Figure 1 is a schematic showing of a preferred direct reduction process embodying the present invention;

Figure 2 is a schematic showing of a modification; and

Figure 3 is a schematic showing of another modification.

Figure 1 shows a continuous two-step reduction system wherein iron oxide ore of a particle size suitable for fluidization passes successively through a heater 10 and primary and secondary reactors 12 and 13, and reducing gas passes through a heater 14 and thence through the secondary and primary reactors counter to the ore. In this embodiment the active constituent of the reducing gas consists essentially of hydrogen of commercial grade. In the ore heater 10 combustion of a suitable fuel raises the ore temperature to about 1700 to 1900° F. In the primary reactor 12, which is maintained at a temperature of about 1200 to 1600° F., the ore is reduced substantially to FeO, the reductant being off-gas from the secondary reactor 13. In the secondary reactor, which is maintained at a similar temperature, FeO can be reduced partially to metallic iron, leaving a sufficient oxygen content to meet specific requirements in a subsequent steelmaking process, or if desired it can be further reduced almost wholly to metallic iron. In the gas heater 14, the gas temperature is raised to about 1300 to 1600° F. by any suitable means. The ore heater and the two reactors can be vessels of any suitable construction wherein ascending streams of gas maintain masses of finely divided ore as fluidized beds, as known in the art. If desired, the two reactors can be housed in the same vessel appropriately partitioned.

Off-gas from the primary reactor at a temperature of about 1200 to 1600° F. passes first through a recuperator 15 where some of its sensible heat is used to preheat fresh reducing gas entering the system to a temperature of about 500 to 1000° F. Although I have shown only a single conventional recuperator, it is understood the heat exchange system can involve multiple stages. Next the off-gas passes through a cooler 16 where it is regenerated by cooling to a maximum temperature of about 100° to condense out water formed in the reduction process. At 17 a portion of the recycled gas is purged from the system to limit build-up of inerts, such as nitrogen, preferably to about 10 to 15 percent. The system illustrated affords particularly efficient utilization of reducing gas especially when FeO is only partially reduced in the secondary reactor. On a molar basis up to about half the reducing gas which enters the secondary reactor 13 can be consumed in the reducing reactions. Hence the volume of gas remaining to be recycled after regeneration and purging is relatively small. As explained hereinafter, the quantity of recycled gas which can be handled in this embodiment of my invention is limited. Nevertheless this embodiment can be applied to reduction processes which are less efficient in gas utilization, provided a sufficient volume is purged.

In accordance with my invention, cooled recycled gas at a relatively low pressure is introduced continuously to a power recovery device 18, such as an expander-turbine compressor. Such devices per se are well known and not part of my invention; hence no detailed showing is deemed necessary. Nevertheless, reference can be made to Staniar "Plant Engineering Handbook," first edition, McGraw-Hill Book Company Inc., New York, p. 466–472, for a showing of typical devices suitable for my purpose. An ejector would be largely equivalent, although less efficient. Fresh reducing gas inherently at a minimum pressure of about 20 atmospheres is introduced continuously to the recuperator 15 and then to the power recovery device 18 in a manner to utilize its kinetic energy to pressurize the recycled reducing gas. Means for manufacturing reducing gas at a pressure of the desired magnitude are known and per se not a part of my invention. Pressurized recycled gas discharged from the power recovery device goes to another cooler 19 where additional moisture is condensed out. Thereafter the recycled gas mixes with fresh reducing gas discharged from the power recovery device and the resultant pressure of the mixture is about 20 to 100 p.s.i.g. or preferably 20 to 60 p.s.i.g. The mixture goes to the gas heater 14 and is used in the reduction system as already described.

To attain the desired pressure balance, the pressure drop in the reduction system is controlled to be in the range of about 20 to 50 p.s.i.g., leaving the off-gas at a pressure of 0 to 50 p.s.i.g. depending on the pressure at which it enters the system. The compression ratio for recycled gas is in the range 1.3 to 4.5 or preferably 1.35 to 3.50. In the reduction process about 20 to 50 percent of the total reducing gas is consumed or purged and replaced with fresh reducing gas. For example, if 10 moles of reducing gas are fed to the reduction system, 2 to 5 moles may be consumed and up to 1 additional mole purged. This portion is replaced with about 3 to 6 moles of fresh gas, which must pressurize the remaining 7 to 4 moles of recycle gas. The maximum mole ratio of recycle gas to fresh gas is about 2.5/1.

Figure 2 shows a modification in which the active constituent of the reducing gas again is hydrogen, but in which the power recovery device 18 furnishes only part of the energy needed to compress the recycle gas. An auxiliary compressor 20 furnishes the remainder of the energy needed. This modification is illustrated as applied to a two-step reduction system similar to that illustrated in Figure 1, but its use is not limited to any maximum ratio of recycle gas to fresh gas and it is useful in less efficient continuous reduction systems which produce a larger volume of recycle gas. A regulated portion of the recycle gas travels from the first cooler 16 to the second cooler 19 via the auxiliary compressor 20, which is connected in parallel with the power recovery device 18. Normally as much of the recycle gas as possible is routed through the power recovery device; the compressor handles only the excess beyond the capacity of the power recovery device to supply the required pressure. Figure 2 shows fresh reducing gas entering the power recovery device 18 without preheating, and shows a recuperator 15a used as a waste heat boiler. Nevertheless it is apparent that the recuperator could be a preheater for fresh gas as in Figure 1, or conversely that the waste heat boiler of Figure 2 could be used in Figure 1 and fresh gas not preheated.

Figure 3 shows a modification in which the reducing gas contains carbon monoxide in an amount up to about 25 percent by volume as an active constituent, as well as hydrogen. The reduction system itself is similar to that embodied in Figures 1 and 2. The reducing reactions produce carbon dioxide as well as water, and it becomes necessary to remove both from the off-gas as it is regenreated. After the recycled gas leaves the second cooler 19, it passes through a carbon dioxide removal unit 21 before mixing with the fresh gas from the power recovery device 18. The unit itself can be of any conventional construction, preferably an M.E.A. absorption tower. This modification includes a purge 17a located beyond the carbon dioxide removal unit, and also an auxiliary compressor 20 similar to Figure 2. Additional energy of course is needed to force the gas through the carbon dioxide removal unit. Hence there commonly is a greater deficiency to be supplied by the auxiliary compressor.

It is seen that all three embodiments of my invention utilize the inherent energy of high pressure reducing gas to pressurize recycled reducing gas. The first embodiment has the advantage that this inherent energy furnishes all the energy needed for this purpose, thus altogether eliminating the need for a compressor. However, its application is limited to reduction systems which afford highly efficient gas utilization or else in which a large volume of off-gas is purged. The other embodiments require an auxiliary compressor to supply part of the energy, but they are applicable generally, regardless of the efficiency of the reduction system or the purge volume. The size of compressor and the power needed to drive it are of course materially less than in systems which fail to utilize the inherent energy.

While I have shown and described certain preferred embodiments of my invention, it is apparent that other modifications may arise. Therefore, I do not wish to be limited to the disclosure set forth but only by the scope of the appended claims.

I claim:

1. In a continuous direct reduction apparatus which includes a fluidized bed reaction chamber, means for preheating reducing gas entering said chamber, and means for regenerating off-gas from said chamber, the combination therewith of a pressurizing means for regenerated off-gas comprising a power recovery device, means for introducing low pressure off-gas to said device, means for introducing fresh reducing gas inherently at high pressure to said device, and means for mixing fresh gas and off-gas discharged from said device to produce gas at an intermediate pressure for introduction to said preheating means.

2. A combination as defined in claim 1 in which said device constitutes the sole pressurizing means.

3. A combination as defined in claim 1 in which said device furnishes only part of the energy needed to pressurize the gas mixture, and comprising an auxiliary compressor in parallel with said device for supplying the energy deficiency.

4. A combination as defined in claim 3 comprising carbon dioxide absorption means on the discharge side of said power recovery device and compressor.

5. In a continuous direct reduction process wherein metallic oxides are treated in a system of fluidized beds with a reducing gas at an elevated temperature and pressure, off-gas leaves the system at a lower pressure and is regenerated and recycled, and fresh reducing gas is added to the off-gas to replace that lost from the system, the fresh gas being initially at substantially higher pressure than gas used in the beds, in combination therewith a method of handling the gases comprising passing low pressure off-gas through a pressurizing means, utilizing energy available in high pressure fresh gas in driving the pressurizing means, thus increasing the pressure of the off-gas while decreasing the pressure of the fresh gas, and thereafter mixing the off-gas and fresh gas at an intermediate pressure.

6. A method as defined in claim 5 wherein energy obtained from high pressure fresh reducing gas constitutes the sole source of energy for pressurizing off-gas.

7. A method as defined in claim 5 wherein energy obtained from high pressure fresh reducing gas furnishes only part of the energy needed to pressurize off-gas, and auxiliary means supplies the remainder of the energy needed.

8. In a continuous direct reduction process wherein metallic oxides are treated in a system of fluidized beds with a reducing gas at a temperature of about 1200 to 1600° F. and a pressure of about 20 to 100 p.s.i.g., off-gas leaves the system at a lower pressure of about 0 to 50 p.s.i.g. and is regenerated, a portion of the off-gas is purged to limit build-up of inerts, the remaining off-gas is recycled, and fresh reducing gas is added to the remaining off-gas to replace that consumed in the reducing reactions and that purged, the fresh gas being initially at a minimum pressure of about twenty atmospheres, in combination therewith a method of handling the gases comprising passing low pressure off-gas through a pressurizing means, utilizing energy available in high pressure fresh gas in driving the pressurizing means, thus increasing the pressure of the off-gas while decreasing the pressure of the fresh gas, and thereafter mixing the off-gas and fresh gas at a pressure of about 20 to 100 p.s.i.g. for use in the system.

9. A method as defined in claim 8 wherein about 20 to 50 percent of the total reducing gas entering the system is lost through consumption and purging, and energy obtained from high pressure fresh reducing gas constitutes the sole source of energy for pressuring off-gas.

10. A method as defined in claim 8 wherein energy obtained from high pressure fresh reducing gas furnishes only part of the energy needed to pressurize off-gas, and auxiliary means supplies the remainder of the energy needed.

References Cited in the file of this patent

UNITED STATES PATENTS

| | | |
|---|---|---|
| 1,969,264 | Grant | Aug. 7, 1934 |
| 2,107,549 | Schmalfedt | Feb. 8, 1938 |
| 2,142,100 | Avery | Jan. 3, 1939 |
| 2,227,666 | Noack | Jan. 7, 1941 |
| 2,401,285 | Woodward et al. | May 28, 1946 |
| 2,547,685 | Brassert et al. | Apr. 3, 1951 |